United States Patent
Merzhanov et al.

[11] Patent Number: 5,149,677
[45] Date of Patent: Sep. 22, 1992

[54] EXOTHERMIC PROCESS FOR THE PRODUCTION OF MOLYBDENUM SILICIDE COMPOSITES

[76] Inventors: Alexandr G. Merzhanov, ulitsa Tretya, 3, kv.2; Alexandr M. Stolin, Institutsky prospekt, 6, kv. 86; Leonid M. Buchatsky, ulitsa Lesnaya, 5, kv. 99; Sergei V. Vedeneev, proezd Stroitelei, 4, kv. 48, all of, Moskovskaya oblast, poselok Chernogolovka, U.S.S.R.

[21] Appl. No.: 696,553

[22] Filed: Apr. 30, 1991

Related U.S. Application Data

[63] Continuation of PCT/SU89/00181, Jun. 30, 1989.

[51] Int. Cl.$^5$ .............................. L04B 35/58
[52] U.S. Cl. ........................ 501/96; 501/128; 423/344
[58] Field of Search ........... 501/96, 128; 423/344

[56] References Cited

U.S. PATENT DOCUMENTS

| | | | |
|---|---|---|---|
| 3,056,658 | 10/1962 | Brennan et al. | 423/344 |
| 3,726,643 | 4/1973 | Merzhanov et al. | 423/409 |
| 4,528,121 | 7/1985 | Matsushita et al. | 501/96 |
| 4,678,760 | 7/1987 | Ray | 501/96 |
| 5,011,800 | 4/1991 | Abramovici et al. | 561/96 |

FOREIGN PATENT DOCUMENTS

| | | |
|---|---|---|
| 0165707 | 12/1985 | European Pat. Off. |
| 779128 | 7/1957 | United Kingdom |
| 779129 | 7/1957 | United Kingdom |
| 780735 | 8/1957 | United Kingdom |

*Primary Examiner*—Karl Group
*Attorney, Agent, or Firm*—Fleit, Jacobson, Cohn, Price, Holman & Stern

[57] ABSTRACT

The invention relates to the production of a new ceramic composite material containing molybdenum disilicide in the form of 20–60 μm grains.

The method involves preparation of an exothermic mixture containing silicon, molybdenum (VI) oxide, aluminium and molybdenum with the following ratio of the components (wt %):

| | |
|---|---|
| silicon | 29–38 |
| molybdenum (VI) oxide | 7–42 |
| aluminium | 3–16 |
| molybdenum | 13–52 | its heat treatment in a combustion mode, followed by compaction of the obtained combustion products by way of at least two-stage compression with a degree of deformation from 0.75 to 0.90 at each stage, at a temperature within 1500° to 1900° C.

4 Claims, No Drawings

EXOTHERMIC PROCESS FOR THE PRODUCTION OF MOLYBDENUM SILICIDE COMPOSITES

This is a continuation of PCT application No. PCT./SU 89/00181 filed on Jun. 30, 1989.

TECHNICAL FIELD

The present invention relates to a new ceramic composite material and a method for its production.

The material proposed herein, being resistant to high-temperature oxidation, will find wide application as protecive; coating and material for electric heating elements used in the chemical and metallurgical industries.

PRIOR ART

Currently known ceramic composite materials on the base of molybdenum disilicide are characterized by insufficiently high level of ultimate working temperature (up to 1750° C.), do not enable the products made of them to maintain high values of resistivity and cyclic heat resistance at said temperatures. Since these characteristics are considered as the main criteria of quality of high-temperature electric heaters and coatings made of said materials operating in an oxidative medium at temperatures in the range of 1100° to 1900° C., it is obvious that the materials fail to meet the increasing requirements of their applications. Products made of these materials are unreliable in service, especially under conditions of sharp and frequent temperature drops.

The above-named ceramic composite materials are obtained by a multistage sintering method. Initially, molybdenum disilicide is produced in a turnace or using aluminothermics, then separated from admixtures, ground and mixed with metal oxides having melting points over 1300° C. A plastifying agent is added to the mixture and a blank is formed by means of extrusion. Said blanks are dried for several hours and then sintered in a stream of hydrogen at a temperature within 900° to 1300° C. to yield articles. The method for producing ceramic composite materials by sintering is multistaged one and is noted for energy consumption, it is lengthy and demands, at certain stages, the use of substances having a deleterious effect on the properties of resulting materials.

A two-component ceramic composite material on the basis of molybdenum disilicide is known (GB, A, 780735). One of the components is molybdenum disilicide with a grain size not over 10 $\mu$m, or its mixture with silicides of refractory metals, or else in the form of a solid solution with said silicides. The other component is silicon oxide taken up combination with oxides of aluminium, berillium, calcium, magnesium, titanium and other refractory metals, in the form of a solid solution or a mixture. These materials are obtained by sintering a mixture of powders of said silicides and oxides.

The resistance of the said materials to high-temperature oxidation is attributable to the formation on their surface of a thin film essentially of silicon oxide which prevents further oxidation of the underlying material. However, at temperatures over 1750° C. a process of intensive evaporation from the surface of the material is initiated, resulting in a sharp increase of the rate of oxidation of said material and destruction of the product based thereon. The size of grains of molybdenum disilicide of not over 10 $\mu$m ensures optimum conditions of the sintering process, but plays a negative role in the process of service. The size of grains increases 4- 8-fold at high temperatures, causing the formation of additional pore space, which results in embrittlement of the materials and destruction of the product based thereon in the course of its service.

DISCLOSURE OF THE INVENTION

It is an object of the invention to provide a ceramic composite material on the basis of molybdenum disilicide characterized by higher values of ultimate operating temperatures, resistivity and cyclic heat resistance at said temperatures at the expense of varying its chemical composition and forming a corresponding structure, as well as a method for producing the said material through the selection of adequate process conditions to ensure the required levels of material characteristics.

The object is attained in a method for producing a ceramic composite material consisting in preparing a mixture containing silicon and a compound of molybdenum, heat treatment of this mixture, in which, according to the invention, as the compound of molybdenum molybdenum oxide (VI) into the mixture, and additionally added are aluminium and molybdenum to yeild an exothermic mixture of the following composition (wt. %):

| | |
|---|---|
| silicon | 29–38 |
| molybdenum (VI) oxide | 7–42 |
| aluminium | 3–16 |
| molybdenum | 13–52 | heat treatment of the exothermic mixture is conducted under combustion conditions, followed by compaction of the resulting combustion products by at least two-stage compression, with a degree of deformation within 0.75–0.90 at each stage, at a temperature within 1500° to 1900° C. The small energy consumption of the process and the production of a ceramic composite material actually in one stage ensures high efficiency of the proposed method, considerably surpassing this index typical of the method of producing said materials by sintering.

It is advisable, so as to secure optimum combustion conditions, to ensure a particle size of the exothermic mixture within 1 to 63 $\mu$m, and to compact it to a density of 40 to 60% of the theoretical prior to the heat treatment.

It is recommended to compact the combustion products by forcing through a die heated to 200°–350° C. In this way it is possible to shape products, for instance, electric heating elements, simultaneously with compacting the material and final formation of its structure.

The obtained ceramic composite material is characterized by its ability to withstand, for long periods of time, temperatures up to 1900° C. in an oxidative medium and in air, features good cyclic thermal resistance (up to 260 cycles) and high resistivity (up to 373 $\mu\Omega \times$cm at 1650° C. temperature).

In order to maintain the stability of characteristics of the proposed material under the conditions of prolonged action of high temperatures, it is advisable to provide for a granular structure of molybdenum disilicide, with a grain size of 20 to 60 $\mu$m.

The ceramic composite material produced according to the invention contains refractory compounds of the type $Al_2O_3$ and $Al_xSi_yO_z$, where: $x=2.6$; $y=3.6$;

$z=5.13$, which form a protective film on the surface of molybdenum disilicide, thus increasing the resistance of the material to high-temperature oxidation in the course of service. This widens the range of operating temperatures in which the performance characteristics of the material are not impaired.

A distinguishing feature of the material proposed herein is that its structure begins to form in the premelting region of temperatures produced by combustion, and ends during subsequent compaction. As a result, a continuous framework is formed consisting of integration 20-60 μm grains of molybdenum disilicide, the integranular space filled with a mixture of aluminium oxide and $Al_xSi_yO_z$. Since said structure is formed on cooling from a temperature higher than the ultimate operating temperature, further service of the material does not lead to alteration of its structure which provides for high performance reliability of products based thereon. Conversely, materials produced by sintering at temperatures lower than the ultimate operating temperature are characterized by grain growth during their service, which deteriorates their physico-mechanical properties, causing embrittlement, swelling and destruction.

The composition and structure of the material, according to the invention, is determined by the composition of the exothermal mixture, conditions of heat treatment and compaction of the products of combustion reaction. The introduction of an oxide of molybdenum (VI), aluminium and molybdenum into the exothermal mixture, apart of silicon, provides for producing a material of the required composition and structure in a combustion mode that does not demand an external supply of reagents. Specially designed experiments on combustion of said exothermal mixture in the atmosphere of argon have confirmed the absence of interaction between silicon and air oxygen. In all cases the phase and chemical composition of combustion products remained constant, an oxide was not formed. Failure to maintain the ratio of components of the exothermal mixture stated herein results either in segregation of the material into molybdenum disilicide and aluminium oxide, or in that the combustion process becomes infeasible. In both cases the ceramic composite material, according to the invention, is not produced in order to ensure optimum combustion conditions it is expedient to prepare the exothermal mixture with particle size within 1 to 63 μm. Combustion of this exothermal mixture yields products in the form of a porous mass, the volume of pores being as high as 50%. Under such conditions the processes of growth of molybdenum disilicide grains and of their coalescence cannot result in the formation of a bonded framework which is necessary for providing the required level of electro-physical, mechanical and performance properties. The compositional micro-inhomogeneities present in the material not having sufficient time for redistribution throughout the volume, zones depleted of silicon are formed which results in the appearance of the lower silicides $Mo_5Si_3$ and $Mo_3Si$ impairing the properties of the material. In order to complete the process of structure formation and achieve the required grain size, the hot porous mass of combustion products should be compacted to reduce porosity down to not over 10%. For this purpose the mass is compacted at a temperature from 1500° to 1900° C., at least in two stages, with a degree of deformation of 0.75 to 0.90 at each stage. The obtained compacted ceramic composite material can be used, without substantial machining, for making electric heating elements or targets and electrodes for deposition of protective coatings. At temperatures exceeding 1900° C., lower silicides of molybdenum are formed in the material, and molybdenum dilisicide is present in an unstable β-phase. At temperatures below 1500° C. compaction of combustion products without their fracture is not feasible. However, even within the range 1500° to 1900° C., a large degree of deformation, defined as $\psi=1-S/S_o$, where $S_o$ is the initial cross-sectional area of the blank, and S is the final cross-sectional area of the blank, can lead to destruction of the material produced. It was found experimentally that this occurs when the degree of deformation exceeds 0.90 per stage, whereas with the degree of deformation less than 0.75 the resulting compaction of combustion products is not sufficient for completing the structure formation processes. It is advisable to compact the exothermal mixture to obtain a density of 40 to 60% of the theoretical to in order to ensure stability of the combustion process.

BEST WAY OF CARRYING OUT THE INVENTION

An exothermal mixture is prepared by throughly mixing powders of silicon, molybdenum (VI) oxide, aluminium and molybdenum, at weight ratio of 35:17:6:42, powder particle size within 1 to 63 μm, in a drum mill. The resulting exothermal mixture is placed into a reaction device and a combustion reaction is initiated by means of a hot tungsten spiral. After 7 seconds the combustion products formed, with a temperature of 1750° C. are forced through two consecutively arranged holes, 15 mm and 6 mm in diameter, in a die, this corresponding to degree of deformation of 0.82 and 0.84, respectively. The die is heated to a temperature of 250° C. The resulting ceramic composite material in the form of a rod consists of 87.5 wt. % of molybdenum disilicide and 12.5 wt % of a mixture of $Al_xSi_yO_z$ and aluminium oxide. Molybdenum disilicide grain size is within 30 to 50 μm. The rod material has the following characteristics:

| | |
|---|---|
| ultimate working temperature | 1900° C. |
| resistivity, at 20° C. | 56 |
| μ Ω · cm: at 1650° C. | 338 |
| cyclic heat resistance, short cycle | 262 |
| cycles long cycle | 190 |

The notion "short cycle" implies heating the material to the ultimate operating temperature during 30 seconds, holding at this temperature for 15 minutes and cooling to room temperature during 10 minutes. This is an index of the material resistance to thermal shocks. The protective coating on the surface can become cracked as a result of sharp temperature drops, causing accelerated destruction of the product made of the material under test. The stronger is the protective coating on the material and the closer its coefficient of thermal expansion to that of the material, the larger is the number of cycles the material can withstand. The notion "long cycle" implies heating the material to the ultimate operating temperature during 30 seconds, holding for 16 hours and cooling down to 300° C. during 8 hours. This index characterizes the suitability of the material for use as electric heating elements or as coatings under cyclic duty related to production activity on a shift basis. The extended period of time during which the material is subjected to temperatures below 1100° C., increases the rate of its oxidation cutting the number of cycles sustained by the material before destruction.

Given below are embodiments of the invention

EXAMPLE 1

An exothermal mixture was prepared by mixing powders of silicon, molybdenum (VI) oxide, aluminium and molybdenum, at a weight ratio of 36:14:5:45, powder particle size within 1 to 63 μm. The mixture was converted into cylindrical billets of 100 g mass, 70 mm in diameter, 25 mm in height, relative density 0.48, which were placed in a reaction device. A combustion reaction is initiated in the billets by means of a hot tungsten spiral. After 6.5 seconds the combustion products at a temperature of 1820° C. were passed through two rolls located in succession, providing for a degree of deformation of 0.75 in each. This yielded a ceramic composite material in the form of a sheet 3 mm thick, consisting of 85 wt. % of $MoSi_2$ and 15 wt. % of a mixture of $Al_xSi_yO_z$ and $Al_2O_3$. The sheet material had the following characteristics:

| | |
|---|---|
| ultimate working temperature | 1900° C. |
| resistivity, at 20° C. | 58 |
| μ Ω 19 cm: at 1650° C. | 340 |
| cyclic heat resistance, short cycle | 250 |
| cycles long cycle | 170 |

A minimun; machining (cutting, welding of current leads) of the sheet can yield an electric heating element for use in furnaces with an oxidative medium or air at temperatures up to 1900° C. The given example illustrates the efficiency of the method proposed. A single process cycle taking a few dozens of seconds and minimum electric power converts initial powdered components into a ceramic composite material which is essentially ready for use as an electric heating element.

EXAMPLE 2

An exothermal mixture was prepared by mixing powders of silicon, molybdenum (VI) oxide, aluminium and molybdenum, at a weight ratio of 33:27:9:31, powder particle size within 1 to 63 μm. The mixture was converted into cylindrical billets of 70 g mass, 35 mm in diameter, 30 mm in height, relative density 0.54, which were placed in a reaction device and a combustion reaction was initiated. After 6.4 seconds the formed combustion products at a temperature of 1750° C. were forced through three holes with diameters of 17.5 mm, 8 mm and 3 mm, provided in succession in a die, which corresponded to degree of deformation of 0.75, 0.79 and 0.86, respectively. This yielded a ceramic composite material in a form of rods 3 mm in diameter having the following composition: 75 wt. % of $MoSi_2$ and 25 wt. % of a mixture of $Al_xSi_yO_z$ and $Al_2O_3$. The material produced had the following characteristics:

| | |
|---|---|
| ultimate working temperature | 1880° C. |
| resistivity, at 20° C. | 62 |
| μ Ω · cm: at 1650° C. | 360 |
| cyclic heat resistance, short cycle | 221 |
| cycles long cycle | 140 |

The following table lists other examples of embodiment of the proposed invention, compaction being carried out in two stages by forcing the reaction products through holes in a heated die, specifying the following data: composition of the exothermic mixture, process variables, composition and characteristics of the ceramic composite material produced in accordance with the invention.

TABLE

| Nos. of examples | Composition of exothermic mixture, wt. % | | | | Compaction of combustion products in die | | | |
|---|---|---|---|---|---|---|---|---|
| | | | | | Degree of deformation by stages | | Tempera-ture, °C. | Die Tempera-ture, °C. |
| | Si | MoO₃ | Al | Mo | I | II | | |
| 1 | 2 | 3 | 4 | 5 | 6 | 7 | 8 | 9 |
| 3 | 38 | 7 | 8 | 52 | 0,82 | 0,84 | 1750 | 200 |
| 4 | 29 | 42 | 16 | 13 | 0,82 | 0,84 | 1900 | 350 |
| 5 | 36 | 14 | 5 | 45 | 0,83 | 0,84 | 1500 | 350 |
| 6 | 33 | 27 | 9 | 31 | 0,75 | 0,88 | 1750 | 250 |
| 7 | 35 | 20 | 7 | 38 | 0,90 | 0,90 | 1750 | 250 |

| Nos. of examples | Composition of material, wt. % | | Properties of material | | | | |
|---|---|---|---|---|---|---|---|
| | | | Ultimate operating temperature, °C. | Resistivity | | Heat resistance, number of cycles | |
| | MoSi₂ | Mixture $Al_xSi_yO_z$ + $Al_2O_3$ | | μΩ × cm at temperature | | | |
| | | | | 20° C. | 1650° C. | Short cycle | Long cycle |
| 1 | 10 | 11 | 12 | 13 | 14 | 15 | 16 |
| 3 | 90 | 10 | 1870 | 48 | 320 | 243 | 180 |
| 4 | 65 | 35 | 1890 | 67 | 373 | 216 | 137 |
| 5 | 85 | 15 | 1880 | 57 | 339 | 256 | 182 |
| 6 | 75 | 25 | 1880 | 62 | 361 | 221 | 149 |
| 7 | 80 | 20 | 1900 | 60 | 351 | 243 | 165 |

INDUSTRIAL APPLICABILITY

The ceramic composite material according to the present invention, resistant to high-temperature oxidation, will find application as a protective coating and as a material for electric heating elements used in the chemical and metallurgical industries.

We claim:

1. A method of producing a ceramic composite material comprising molybdenum silicide, aluminum oxide, and $Al_x Si_y O_z$, where: x=2.6, y=3.6, z=5.13 characterized in that an exothermic mixture of the following composition (wt %) is formed:

| | |
|---|---|
| silicon | 29–38 |
| molybdenum (VI) oxide | 7–42 |
| aluminium | 3–16 |

| -continued | |
|---|---|
| molybdenum | 13–52 | heat treatment of the said mixture is conducted in a combustion mode, followed by compaction of the obtained combustion products by way of at least two-stage compression with a degree of deformation within 0.75 to 0.90 at each stage, at a temperature within 1500° to 1900° C.

2. A method according to claim 1, characterized in that the compaction of combustion products is carried out by way of forcing them through a die heated to a temperature of 200°–350° C.

3. A method according to claim 11, characterized in that the particle size of the prepared exothermic mixture is within 1.0 to 63 μm.

4. A method according to claim 3, characterized in that the exothermic mixture is compacted, prior to heat treatment, to a density of 40 to 60% of the theoretical.

* * * * *